United States Patent [19]
Hsieh

[11] Patent Number: 5,920,254
[45] Date of Patent: Jul. 6, 1999

[54] STEERING WHEEL LOCK WITH VIBRATION INITIATED ALARM CIRCUIT

[76] Inventor: Chen-Kuei Hsieh, No. 29, Lane 488 Section 2, Shing-Ren Road, Chung-Li City, Taiwan

[21] Appl. No.: 09/109,006

[22] Filed: Jul. 1, 1998

[51] Int. Cl.⁶ .................................................. B60R 25/10
[52] U.S. Cl. .................. 340/426; 340/425.5; 70/209; 70/207; 70/226; 70/237; 70/DIG. 49; 307/10.2
[58] Field of Search ................ 340/426, 425.5; 307/10.2; 70/209, 207, 210, 226, 237, DIG. 49

[56] References Cited

U.S. PATENT DOCUMENTS

| | | | |
|---|---|---|---|
| 5,331,307 | 7/1994 | Eizen | 340/426 |
| 5,372,019 | 12/1994 | Hsiao | 70/209 |
| 5,381,679 | 1/1995 | Cummins | 70/209 |
| 5,400,627 | 3/1995 | Liao | 70/209 |
| 5,452,597 | 9/1995 | Chen | 70/209 |
| 5,454,242 | 10/1995 | Su | 70/209 |
| 5,636,537 | 6/1997 | Chen | 70/209 |
| 5,765,414 | 6/1998 | Yu | 70/209 |

*Primary Examiner*—Jeffery A. Hofsass
*Assistant Examiner*—Julie Lieu
*Attorney, Agent, or Firm*—Pro-Techtor International Services

[57] ABSTRACT

A steering wheel lock includes a lock body with a stop bar at one side, a locating device fixedly fastened to the lock body, the locating device having two vertical barrels at two opposite sides and a U-shaped retainer plate at the top, a U-shaped shackle, and a vibration-initiated alarm signal mounted inside the lock body, wherein the U-shaped retainer plate of the locating device is hooked on the periphery of the steering wheel of a car, permitting the stop bar of the lock body to be stopped at a part inside the car, and the U-shaped shackle is inserted through the barrels of the locating device into lock holes on the lock body and locked by the lock body to secure the locating device and the lock body in place and to stop the steering wheel from rotation; a radio transmitter circuit is connected to the vibration-initiated alarm circuit, the radio transmitter circuit being triggered to transmit a radio alarm signal into the air when the vibration-initiated alarm circuit is induced to alarm; a radio receiver is provided and carried by the user for receiving the radio alarm signal from the radio transmitter circuit.

2 Claims, 5 Drawing Sheets

STEERING WHEEL LOCK WITH VIBRATION INITIATED ALARM CIRCUIT

BACKGROUND OF THE INVENTION

The present invention relates to steering wheel locks, and more particularly to such a steering wheel lock which is simple and strong, and which automatically produces an alarm signal when vibrated by an external force.

FIG. 5 shows a steering wheel lock fastened to an automobile's steering wheel to stop it from rotation. This structure of steering wheel lock comprises a first locking bar 1', a second locking bar 2', and a locking mechanism 5'. The first locking bar 1' is slidably inserted into the second locking bar 2'. The first locking bar 1' and the second locking bar 2' are fixedly mounted with a respective hook 3'. When in use, the locking mechanism 5' is unlocked, then the fist locking bar 1' is extended out of the second locking bar 2', enabling the hooks 3' to be respectively hooked on the periphery of the steering wheel 4', and then the locking mechanism 5' is locked. This structure of steering wheel lock is still not satisfactory in function. Because the first locking bar 1' is a solid bar, the whole assembly of the steering wheel lock is heavy. Further, this structure of steering wheel lock can easily be broken and disconnected from the steering wheel.

SUMMARY OF THE INVENTION

It is one object of the present invention to provide a steering wheel lock which has a simple structure, and is easy to operate. It is another object of the present invention to provide a steering wheel lock which is equipped with an alarm circuit that produces an audio alarm signal when the steering wheel lock is vibrated or damaged by an external force. It is still another object of the present invention to provide a steering wheel lock which is equipped with a radio signal transmitter circuit connected to the alarm circuit thereof, the radio signal transmitter circuit transmits a radio alarm signal to a radio signal receiver being carried by the user when the alarm circuit is triggered, informing the user about the intrusion of a burglar into the automobile.

DETAILED DESCRIPTION OF THE PREFERRED EMBODIMENT

Figure 1:
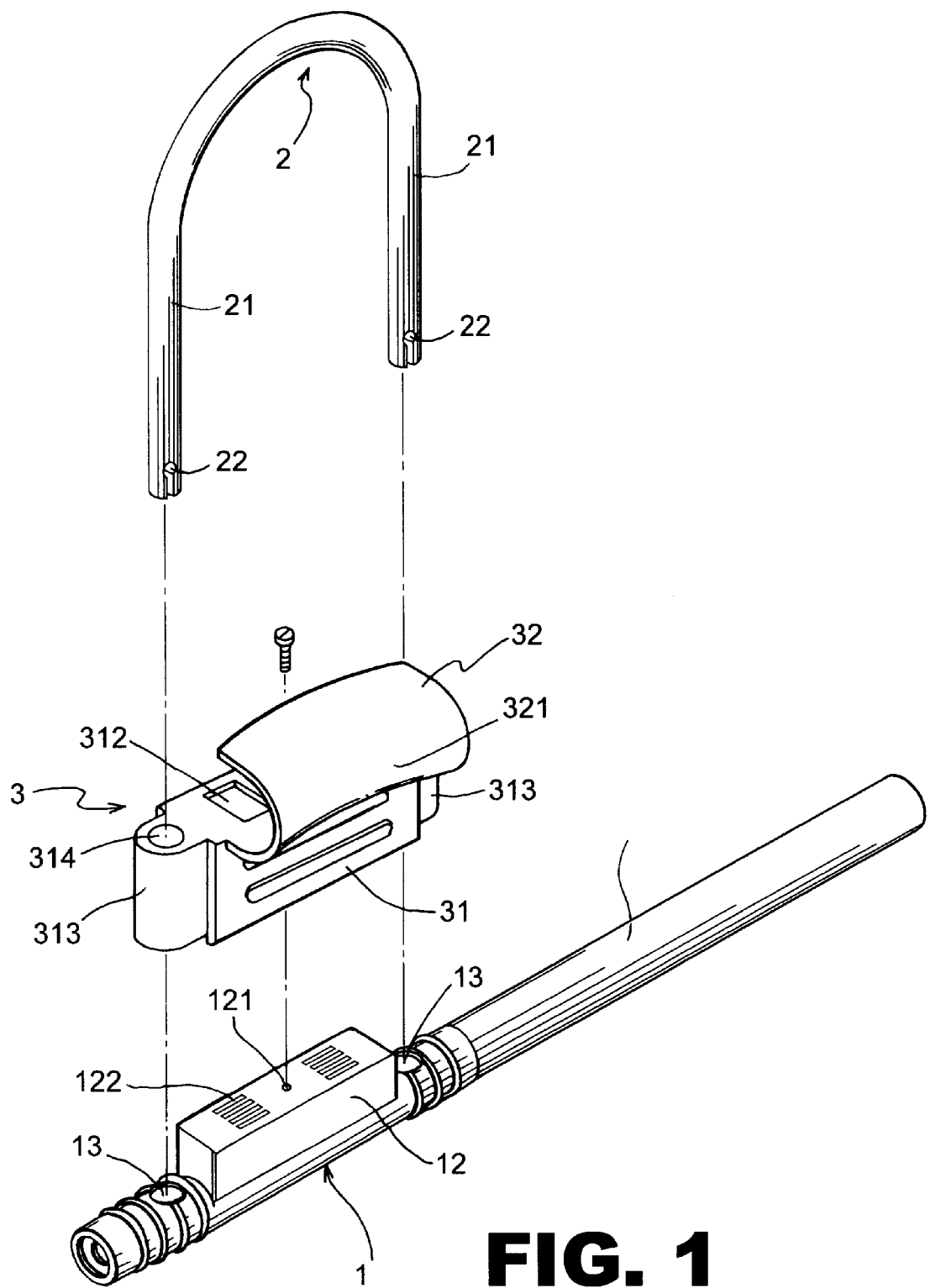
FIG. 1 is an exploded view of a steering wheel lock according to the present invention.
Figure 2:
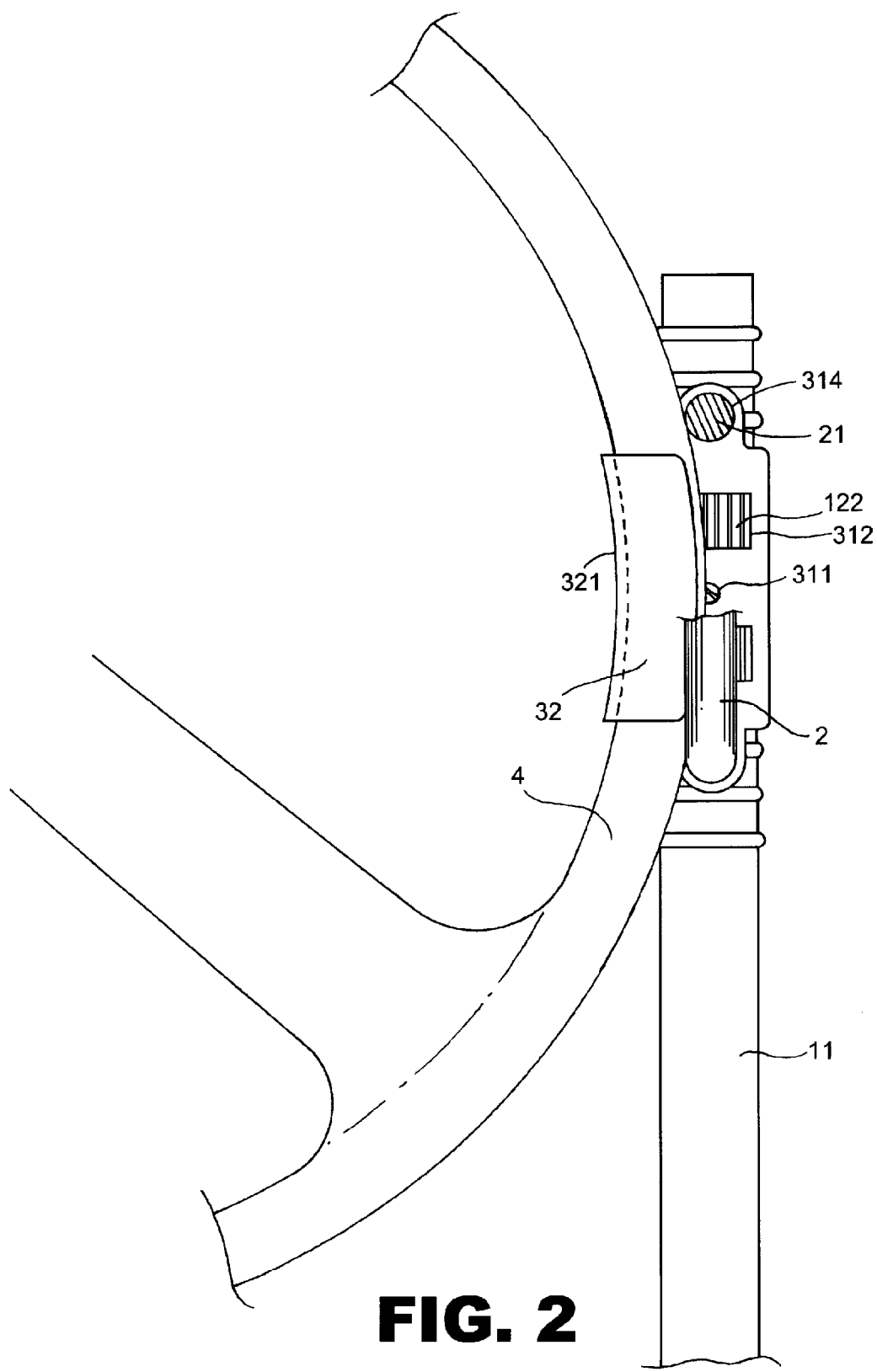
FIG. 2 is an applied view of the present invention, showing the steering wheel lock fastened to the steering wheel.

Referring to FIGS. 1 and 2, a steering wheel lock 1 in accordance with the present invention is generally comprised of a lock body 1, a U-shaped shackle 2, and a locating device 3. A stop bar 11 is integral with one side of the lock body 1. The length of the stop bar 11 is about 40–50 cm. The lock body 1 comprises a casing 12, and two lock holes 13 equally spaced from the casing 12 at two opposite sides. The casing 12 has at least one screw hole 121, and holes 122 corresponding to buzzer means inside the lock body 1. The U-shaped shackle 2 has a locating groove 22 at each of its both ends 21. The locating device 3 comprises a rectangular shell 31, two vertical barrels 313 respectively integral with both sides of the rectangular shell 31, and a retainer plate 32 raised from one vertical side wall of the rectangular shell 31 at the top between the barrels 313. The retainer 32 has a substantially U-shaped wall 321 for hooking on the periphery of the steering wheel 4. The vertical barrels 313 each define an axial through hole 314. The shell 31 has a mounting hole 311 and through holes 312 corresponding to the screw hole 121 and holes 122 on the casing 12 of the lock body 1. The mounting hole 311 of the shell 31 is fixedly fastened to the screw hole 121 on the casing 12 of the lock body 1 by a screw, enabling the axial through holes 314 of the barrels 313 to be respectively maintained in alignment with the lock holes 13 on the lock body 1.

Referring to FIG. 2 again, when in use, the retainer plate 32 of the locating device 3 is hooked on the periphery of the steering wheel 4, then the two ends 21 of the U-shaped shackle 2 are respectively inserted through the axial through holes 314 on the barrels 313 into the lock holes 13 on the lock body 1, and then locked by the locking mechanism in the lock body 1 (With respect to the structure of the locking mechanism, please refer to U.S. Pat. No. 5,404,735, which was issued to the present inventor). After installation, the U-shaped shackle 2 is retained attached to the periphery of the steering wheel 4 at an outer side. If the steering wheel lock 1 is damaged or vibrated by an external force, the internal alarm circuit of the steering wheel lock 1 is immediately triggered to produce an audible alarm signal.

Figure 3:
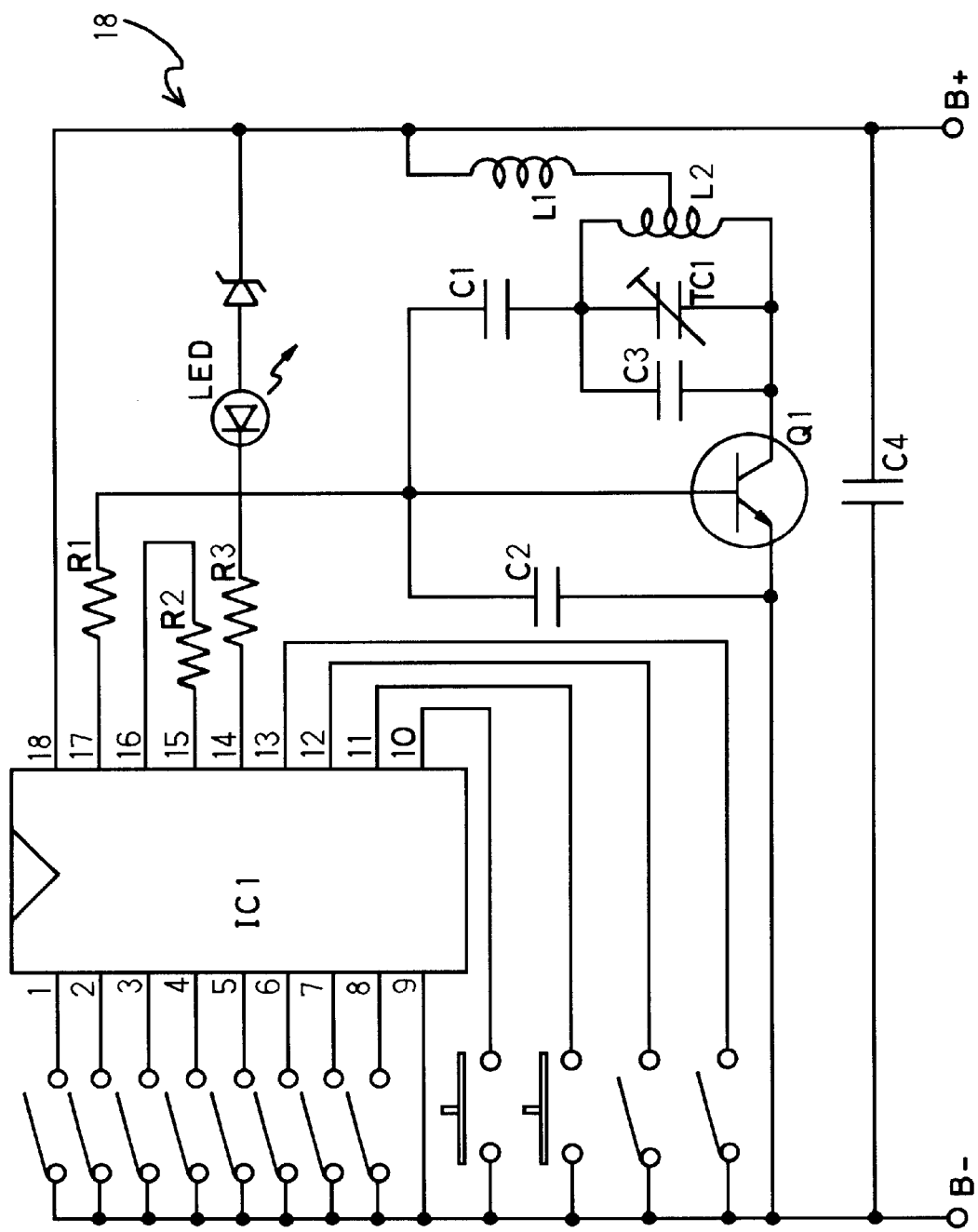
FIG. 3 is a circuit diagram of a radio signal transmitter circuit according to the present invention.
Figure 4:
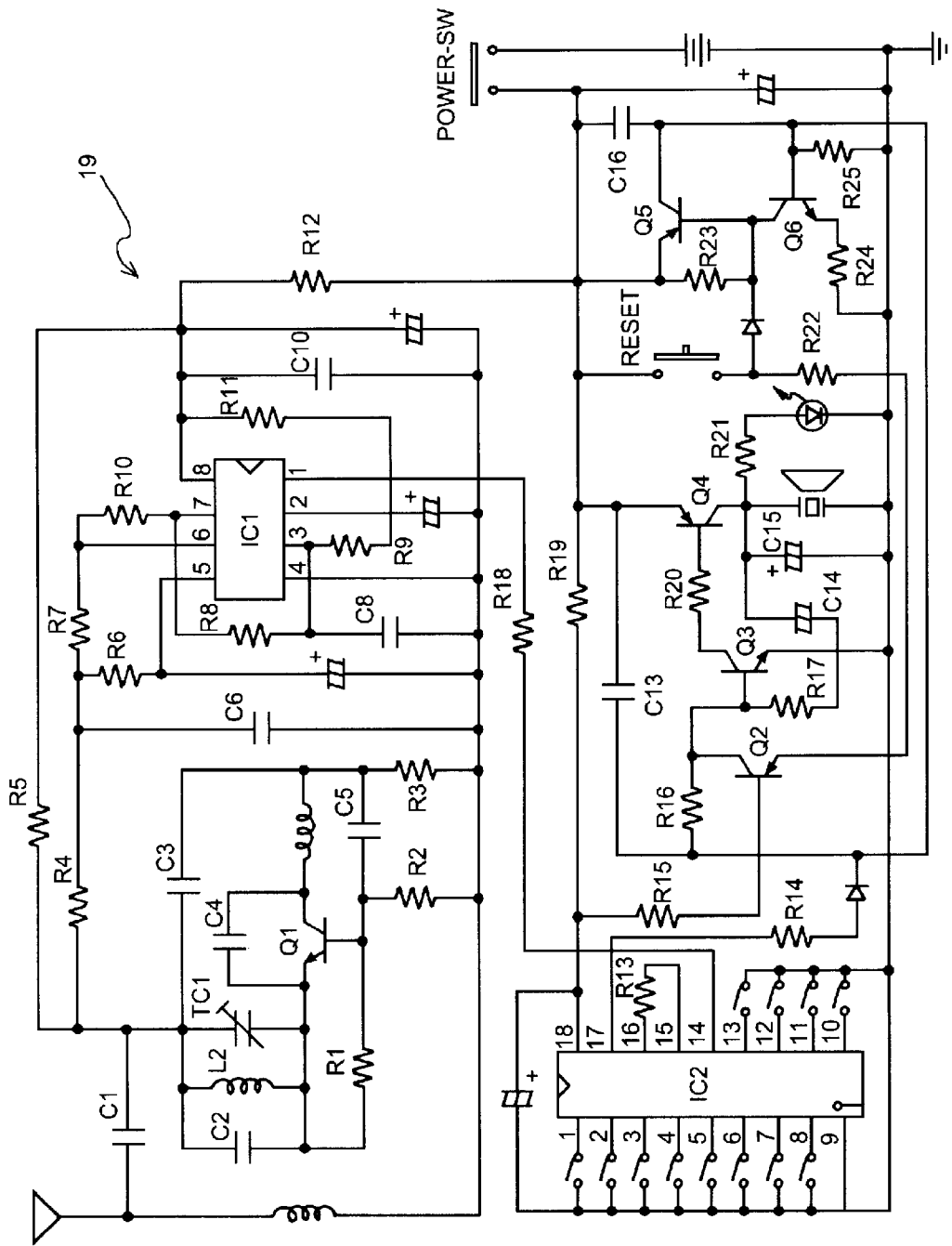
FIG. 4 is a circuit diagram of a radio signal receiver according to the present invention.
Figure 5:
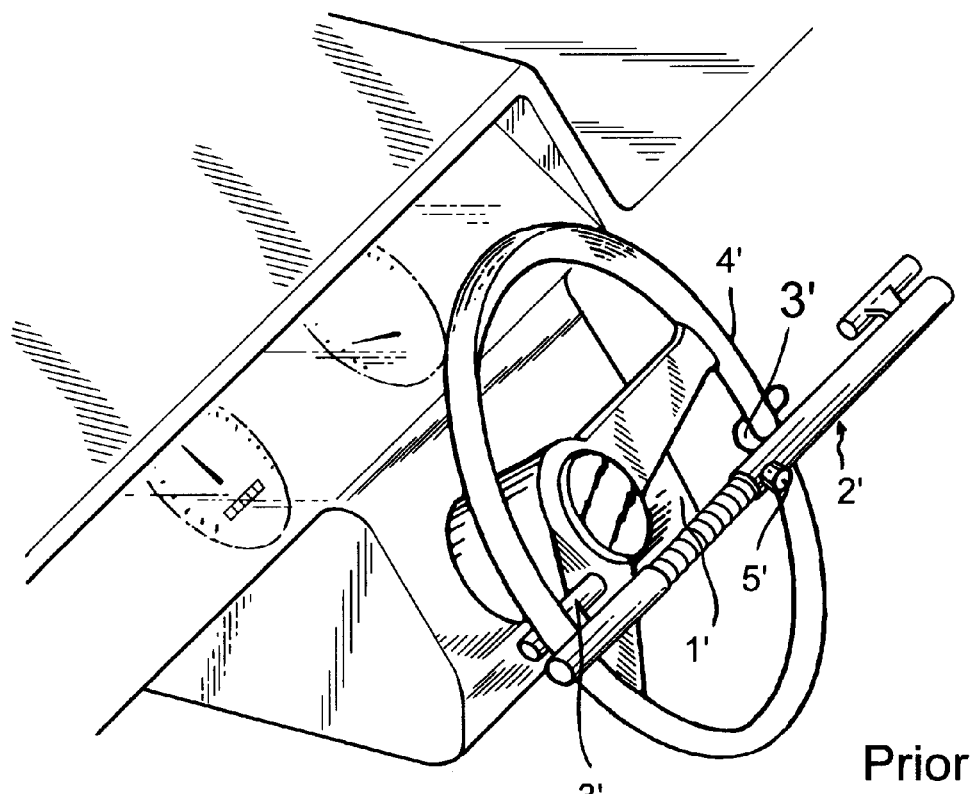
FIG. 5 shows a steering wheel lock fastened to an automobile's steering wheel according to the prior art.

Referring to FIGS. 3 and 4, a radio signal transmitter 18 is connected to the aforesaid steering wheel lock 1, and a separate radio signal receiver 19 is provided for receiving radio alarm signal from the radio signal transmitter 18. The radio signal transmitter circuit 18, as shown in FIG. 3, comprises an encoder IC IC1 for encoding 256 or 6561 code combinations. 15PIN and 16PIN of the encoder IC IC1 and a resistor R2 form an oscillation circuit OSC. Oscillation signal from the oscillation circuit OSC is sent through 17PIN of the encoder IC IC1 to the base of a transistor Q1 via a resistor R1 for modulation. The transistor Q1 transmits the signal by a high frequency. L2, TC1, C3 form a parallel resonance circuit. L1 is a choke coil. C2 is a high frequency response capacitor for Q1. C4 is a high frequency by-pass capacitor.

Referring to FIG. 4, in the radio signal receiver 19, antenna signal is transmitted through C1 to TC1, C2 and L2 for parallel resonance; received signal is transmitted to Q1 for amplification; Q1 is a high frequency mixing circuit; signal is sent through R4, R6 to IC1-5PIN for amplification, then through R8 to IC1-3PIN for amplification, and then outputted through 1PIN to IC2-14PIN via R18, and then converted into digital control signal by IC2 and outputted through 17PIN; IC2-15PIN and 16PIN form with R13 an oscillation circuit OSC; digital control signal is sent through R14 to Q5 and Q6, causing Q5 to oscillate; oscillation signal from Q5 is sent through R16 to Q3-B, causing Q3 to be electrically connected, and then sent through R20 to Q4-B, causing Q4 to be electrically connected, and therefore LED and buzzer that are connected to Q4 are turned on; high frequency oscillation is further discharged through C14 and R17, and then returned to Q3-B, thereby causing Q3 to oscillate at a low frequency; C6;C8 are filter capacitor; C10;C11;C12;C17 are by-pass capacitors.

If the aforesaid steering wheel lock 1 is damaged or vibrated, the alarm circuit is triggered to produce an audible alarm signal, and at the same time, the transmitter circuit 18 is driven to transmit a radio alarm signal into the air. Upon receive of the alarm signal from the radio signal transmitter circuit 18, the radio signal receiver 19 is immediately triggered to produce an (audio or visual) alarm signal, advising the user to take the necessary actions.

What the invention claimed is:

1. A steering wheel lock comprising:

a lock body, said lock body comprising a casing, two lock holes equally spaced from said casing at two opposite sides, a stop bar extended from one side thereof, and a vibration initiated alarm circuit mounted inside said casing;

a locating device fixedly fastened to said lock body for hooking on the steering wheel, said locating device comprising a rectangular shell fixedly fastened to the casing of said lock body, two vertical barrels respectively integral with two opposite sides of said rectangular shell, and a substantially U-shaped retainer plate raised from one vertical side wall of said rectangular shell for hooking on the periphery of the steering wheel; and an U-shaped shackle fastened to said locating device and said lock body and locked to secure said locating device and said lock body to the steering wheel, said U-shaped shackle having two ends respectively inserted through the axial through holes on said barrels of said locating device into the lock holes on said lock body and locked by a locking mechanism in said lock body, both ends of said U-shaped shackle each having a locating groove for locking by said locking mechanism.

2. The steering wheel lock of claim 1 further comprising a radio transmitter circuit mounted in said casing of said lock body and connected to said alarm circuit, said radio transmitter circuit being triggered to transmit a radio alarm signal into the air when said alarm circuit is induced to alarm, and a radio receiver for receiving the radio alarm signal from said radio transmitter circuit, wherein said radio signal transmitter circuit comprises an encoder IC IC1, 15PIN and 16PIN of said encoder IC IC1 forming with a resistor R2 an oscillation circuit OSC, oscillation signal from said oscillation circuit OSC being sent through 17PIN of said encoder IC IC1 to the base of a transistor Q1 via a resistor R1 for modulation, L2, TC1, C3 forming a parallel resonance circuit. L1 is a choke coil; radio antenna signal is transmitted through C1 to TC1, C2 and L2 for parallel resonance; received signal is transmitted to Q1 for amplification and then sent through R4, R6 to IC1-5PIN for amplification, and then through R8 to IC1-3PIN for amplification, and then outputted through 1PIN to IC2-14PIN via R18, and then converted into digital control signal by IC2 and outputted through 17PIN, IC2-15PIN and 16PIN forming with R13 an oscillation circuit OSC, digital control signal being sent through R14 to Q5 and Q6, causing Q5 to oscillate; oscillation signal from Q5 being sent through R16 to Q3-B, causing Q3 to be electrically connected, and then sent through R20 to Q4-B, causing Q4 to be electrically connected to turn on lighting emitting diode and buzzer means to work, high frequency oscillation being further discharged through C14 and R17, and then returned to Q3-B, thereby causing Q3 to oscillate at a low frequency.

* * * * *